US012709688B2

(12) United States Patent
Yeh et al.

(10) Patent No.: US 12,709,688 B2
(45) Date of Patent: Aug. 18, 2026

(54) CORROSION RESISTANT STRUCTURE

(71) Applicant: INDUSTRIAL TECHNOLOGY RESEARCH INSTITUTE, Hsinchu (TW)

(72) Inventors: Hsiu-Pang Yeh, Hsinchu City (TW); Wei-Cheng Tang, Hsinchu City (TW); Shu-Yun Chien, Hsinchu City (TW); Hui-Chu Huang, Toufen City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 174 days.

(21) Appl. No.: 18/666,554

(22) Filed: May 16, 2024

(65) Prior Publication Data

US 2025/0215240 A1 Jul. 3, 2025

(30) Foreign Application Priority Data

Dec. 29, 2023 (TW) ................................ 112151530

(51) Int. Cl.

| | |
|---|---|
| ***C23C 28/02*** | (2006.01) |
| ***B32B 15/01*** | (2006.01) |
| ***B32B 15/04*** | (2006.01) |
| ***B32B 15/08*** | (2006.01) |
| ***B32B 15/082*** | (2006.01) |
| ***B32B 15/09*** | (2006.01) |
| ***B32B 15/092*** | (2006.01) |
| ***B32B 15/095*** | (2006.01) |

(Continued)

(52) U.S. Cl.

CPC ............ *C09D 5/086* (2013.01); *B32B 15/012* (2013.01); *B32B 15/013* (2013.01); *B32B 15/04* (2013.01); *B32B 15/043* (2013.01); *B32B 15/08* (2013.01); *B32B 15/082* (2013.01); *B32B 15/09* (2013.01); *B32B 15/092* (2013.01); *B32B 15/095* (2013.01); *B32B 15/18* (2013.01); *B32B 15/20* (2013.01); *C09D 5/084* (2013.01); *C09D 7/61* (2018.01); *C09D 7/63* (2018.01); *C09D 133/02* (2013.01); *C09D 163/00* (2013.01); *C09D 167/00* (2013.01); *C09D 175/04* (2013.01); *C23C 2/06* (2013.01); *C23C 2/12* (2013.01); *C23C 28/025* (2013.01); *C23C 28/30* (2013.01); *C23F 1/00* (2013.01); *C08K 3/105* (2018.01); *C08K 2003/287* (2013.01); *C08K 2003/321* (2013.01); *C08K 2003/325* (2013.01); *C08K 2003/326* (2013.01); *C08K 2003/327* (2013.01); *C08K 5/06* (2013.01); *Y10T 428/12556* (2015.01); *Y10T 428/12569* (2015.01); *Y10T 428/12799* (2015.01); *Y10T 428/12972* (2015.01); *Y10T 428/12979* (2015.01); *Y10T 428/24967* (2015.01); *Y10T 428/24975* (2015.01); *Y10T 428/26* (2015.01); *Y10T 428/263* (2015.01); *Y10T 428/264* (2015.01); *Y10T 428/265* (2015.01)

(58) Field of Classification Search

CPC .......... C09D 5/086; C09D 5/084; C09D 7/61; C09D 7/63; C09D 133/02; C09D 163/00; C09D 167/00; C09D 175/04; C23C 2/06; C23C 2/12; C23C 28/025; C23C 28/30; C08K 3/105; C08K 3/32; C08K 5/06; C08K 5/053; C08K 2003/287; C08K 2003/321; C08K 2003/325; C08K 2003/326; C08K 2003/327; B32B 15/012; B32B 15/013; B32B 15/04; B32B 15/043; B32B 15/08; B32B 15/082; B32B 15/09; B32B 15/092; B32B 15/095; B32B 15/18; B32B 15/20; Y10T 428/12556; Y10T 428/12569; Y10T 428/12757; Y10T 428/12799; Y10T 428/12972; Y10T 428/12979; Y10T 428/24967; Y10T 428/24975; Y10T 428/263; Y10T 428/264; Y10T 428/265; Y10T 428/26

See application file for complete search history.

(56) References Cited

U.S. PATENT DOCUMENTS

| | | | |
|---|---|---|---|
| 4,840,668 | A | 6/1989 | Gawol et al. |
| 2011/0311727 | A1 | 12/2011 | Kang et al. |

(Continued)

FOREIGN PATENT DOCUMENTS

| | | | |
|---|---|---|---|
| CN | 1668460 | A | 9/2005 |
| CN | 102989649 | B | 4/2015 |

(Continued)

OTHER PUBLICATIONS

Machine Translation, Li, CN 104817896A, Aug. 5, 2015. (Year: 2015).*

(Continued)

*Primary Examiner* — Michael E. La Villa

(74) *Attorney, Agent, or Firm* — Birch, Stewart, Kolasch & Birch, LLP

(57) ABSTRACT

A corrosion resistant structure is provided. The corrosion resistant structure includes a steel layer, a metal layer, and an organic layer. The metal layer contains zinc, aluminum, or a combination thereof. The metal layer is disposed on the steel layer. The metal layer is in contact with the steel layer. The metal layer and the steel layer have different compositions. The organic layer is disposed on the metal layer. The organic layer is in contact with the metal layer. The organic layer includes an organic resin, a diol compound containing two aliphatic rings, and an alkaline earth metal salt or an alkaline earth metal aluminum phosphate.

11 Claims, No Drawings

(51) Int. Cl.

| | |
|---|---|
| ***B32B 15/18*** | (2006.01) |
| ***B32B 15/20*** | (2006.01) |
| ***C09D 5/08*** | (2006.01) |
| ***C09D 7/61*** | (2018.01) |
| ***C09D 7/63*** | (2018.01) |
| ***C09D 133/02*** | (2006.01) |
| ***C09D 163/00*** | (2006.01) |
| ***C09D 167/00*** | (2006.01) |
| ***C09D 175/04*** | (2006.01) |
| ***C23C 2/06*** | (2006.01) |
| ***C23C 2/12*** | (2006.01) |
| ***C23C 14/16*** | (2006.01) |
| ***C23C 28/00*** | (2006.01) |
| ***C23F 1/00*** | (2006.01) |
| *C08K 3/105* | (2018.01) |
| *C08K 3/28* | (2006.01) |
| *C08K 3/32* | (2006.01) |
| *C08K 5/06* | (2006.01) |

(56) References Cited

U.S. PATENT DOCUMENTS

2013/0243488 A1 9/2013 Kojima et al.
2020/0208006 A1* 7/2020 Liao ........................ C08L 71/00
2021/0389686 A1 12/2021 Kakinuma et al.

FOREIGN PATENT DOCUMENTS

CN 104817896 A * 8/2015 ........... C09D 123/34
JP 2017-171998 A 9/2017
TW 201132801 A1 10/2011
TW 201638241 A 11/2016
TW 202241712 A 11/2022

OTHER PUBLICATIONS

Taiwanese Office Action and Search Report for Taiwanese Application No. 112151530, dated Jun. 28, 2024.

* cited by examiner

CORROSION RESISTANT STRUCTURE

CROSS REFERENCE TO RELATED APPLICATION

The present application is based on, and claims priority from, Taiwan Application Serial Number 112151530, filed on Dec. 29, 2023, the disclosure of which is hereby incorporated by reference herein in its entirety.

TECHNICAL FIELD

The technical field relates to a corrosion resistant structure.

BACKGROUND

Many large-scale photovoltaic facilities are located along coastlines or on rooftops in industrial areas. A hot, rainy, and high salt content environment, makes a cloudy and harshly corrosive effective at photovoltaic facilities. Uncoated galvanized brackets, for example, may become severely rusted after just 24 months of use. Conventional corrosion-resistant coatings need an anti-rust epoxy primer containing lead or chromium salt to be effective, which can pollute the environment even more, and this coating often peels off in just 3 to 5 years.

Accordingly, a long-lasting corrosion-resistant structure is called for.

SUMMARY

One embodiment of the disclosure provides a corrosion resistant structure, including a steel layer, a metal layer, and an organic layer. The metal layer contains zinc, aluminum, or a combination thereof. The metal layer is disposed on the steel layer and is in contact with the steel layer. The metal layer and the steel layer have different compositions. The organic layer is disposed on the metal layer and is in contact with the metal layer. The organic layer includes an organic resin, a diol compound containing two aliphatic rings, and an alkaline earth metal-containing salt or an alkaline earth metal aluminum phosphate.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a corrosion resistant structure, including a steel layer; a metal layer containing zinc, aluminum, or a combination thereof disposed on the steel layer and in contact with the steel layer, and the metal layer and the steel layer have different compositions; and an organic layer disposed on the metal layer and in contact with the metal layer. In some embodiments, the organic layer includes an organic resin, a diol compound containing two aliphatic rings, and an alkaline earth metal salt or an alkaline earth metal aluminum phosphate.

In some embodiments, the diol compound containing two aliphatic rings has a chemical structure of

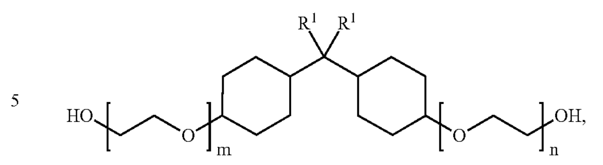

in which each $R^1$ is independently H or $C_{1-3}$ alkyl group, and each of m and n is independently an integral of 1 to 10. For example, the diol compound containing two aliphatic rings may have a chemical structure of

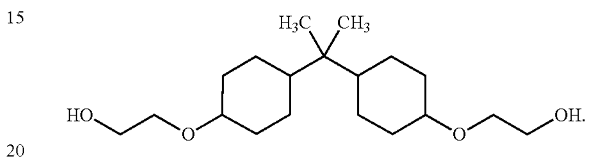

The organic resin is not limited to any specific resin, as long as it can adhere to the metal layer. In some embodiments, the organic resin may include polyacrylic acid, polyurethane resin, polyester resin, epoxy resin, or a combination thereof. The organic resin may have a weight average molecular weight (i.e. Mw) of 1000 to 10000. For example, the polyacrylic acid resin can be 7333-X-60 from Eternal Materials Co., Ltd., R302-57 from Yi-Mei Paints Technology Co., Ltd., or another applicable polyacrylic resin. The polyurethane resin can be URE-007 from Ching-Tai Resins Chemical Co., Ltd., NY-2558 or NY-2508 from Nanya Plastics Co., or another applicable polyurethane resin. The polyester resin can be V1B05 from Nanya Plastics Co. or another applicable polyester resin. The epoxy resin can be NPES-907 from Nanya Plastics Co. or another applicable epoxy resin.

In some embodiments, the alkaline earth metal salt may include strontium phosphate, magnesium phosphate, calcium phosphate, calcium magnesium phosphate, magnesium nitrate, calcium nitrate, or strontium nitrate. In some embodiments, the alkaline earth metal aluminum phosphate may include strontium aluminum phosphate or calcium aluminum phosphate. If another filler such as mica is used, the corrosion resistant effect of the corrosion resistant structure will be poor.

In some embodiments, the organic resin and the diol compound containing two aliphatic rings have a weight ratio of 1:0.16 to 1:1. If the amount of the diol compound containing two aliphatic rings is too low, the coating such as the organic layer and the metal layer will have an insufficient adhesion therebetween. If the amount of the diol compound containing two aliphatic rings is too high, the coating such as the organic layer will have a hardness that is too low.

In some embodiments, the organic resin and the alkaline earth metal salt or the alkaline earth metal aluminum phosphate have a weight ratio of 1:0.21 to 1:1.28. If the amount of the alkaline earth metal salt or the alkaline earth metal aluminum phosphate is too low, the corrosion resistant effect of the corrosion resistant structure will be insufficient. If the amount of the alkaline earth metal salt or the alkaline earth metal aluminum phosphate is too high, the organic layer will have a gloss that is too low and the corrosion resistant structure has a poor cracking property (e.g. being easily cracked).

In some embodiments, the organic layer may have a thickness of 30 micrometers to 100 micrometers. If the organic layer is too thin, the rust resistance of the coating such as the organic layer will be insufficient. If the organic layer is too thick, the drying speed of the coating will be slow and therefore negatively influencing the product processability.

In some embodiments, the steel layer may include cold-rolled steel, hot-rolled steel, or carbon steel.

In some embodiments, the metal layer may include zinc metal, aluminum metal, aluminum zinc alloy, magnesium aluminum zinc alloy, or magnesium aluminum zinc nickel alloy. In some embodiments, the metal layer has a thickness of 5 micrometers to 100 micrometers. If the metal layer is too thin, the rust resistance of the overall structure will be insufficient. If the metal layer is too thick, it cannot be cost effective. In addition, if the metal layer is free of zinc, aluminum, or a combination thereof, the corrosion resistant effect of the corrosion resistant structure will be poor.

Because the organic layer includes the diol compound containing two aliphatic rings and the alkaline earth metal salt or the alkaline earth metal aluminum phosphate, the three-layered structure composed of the steel layer, the metal layer, and the organic layer may form the corrosion resistant structure with high gloss, high coating adhesion, low cracking, and high corrosion resistance.

Below, exemplary embodiments will be described in detail as to be easily realized by a person having ordinary knowledge in the art. The inventive concept may be embodied in various forms without being limited to the exemplary embodiments set forth herein.

EXAMPLES

In following examples, the diol compound containing two aliphatic rings had a chemical structure of

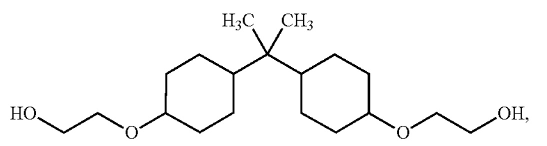

which could be synthesized by the method disclosed in Taiwan Patent No. TWI630954. The gloss of the organic layer was measured according to the standard ASTM C584-81 (passed the test when the measured value was 50 GU or higher). The adhesion of the organic layer was measured according to the standard ASTM D3359 (passed the test when the measured value was higher than 2 B). The cracking of the organic layer was measured according to the standard ISO 4628-2 (passed the test when the measured value was 2 (S2) or lower). The corrosion resistance of the organic layer was measured according to the standard ASTM D1654 (when the measured level was 6 or higher). The accelerated corrosion test was performed according to the standard ASTM B117 (passed the test when the corrosion resistant period was 1680 hours or more).

Comparative Example 1

Polyacrylic acid (7333-X-60 commercially available from Eternal Materials Co., Ltd.) was coated on a cold-rolled steel (Z27 commercially available from China Steel Corporation) containing a dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 37 GU (Not Pass) and an adhesion of 0 B (Not Pass), and could not pass the cracking test and the corrosion resistant test.

Comparative Example 2

1 part by weight of the polyacrylic acid 7333-X-60 and 0.02 parts by weight of the diol compound containing two aliphatic rings were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 39 GU (Not Pass) and an adhesion of 2 B (Not Pass), and could not pass the cracking test and the corrosion resistant test.

Comparative Example 3

1 part by weight of the polyacrylic acid 7333-X-60 and 0.16 parts by weight of the diol compound containing two aliphatic rings were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 54 GU (Pass) and an adhesion of 3 B (Pass), and could not pass the cracking test and the corrosion resistant test.

Comparative Example 4

1 part by weight of the polyacrylic acid 7333-X-60 and 0.3 parts by weight of the diol compound containing two aliphatic rings were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 61 GU (Pass) and an adhesion of 5 B (Pass), and could not pass the cracking test and the corrosion resistant test.

Comparative Example 5

1 part by weight of the polyacrylic acid 7333-X-60 and 1 part by weight of the diol compound containing two aliphatic rings were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 67 GU (Pass) and an adhesion of 4 B (Pass), and could not pass the cracking test and the corrosion resistant test.

Comparative Example 6

1 part by weight of the polyacrylic acid 7333-X-60, 0.3 parts by weight of the diol compound containing two aliphatic rings, and 0.1 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 62 GU (Pass) and an adhesion of 5 B (Pass), could pass the cracking test, and could not pass the corrosion resistant test.

Example 1

1 part by weight of the polyacrylic acid 7333-X-60, 0.3 parts by weight of the diol compound containing two aliphatic rings, and 0.21 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 63 GU (Pass) and an adhesion of 5 B (Pass), and could pass the cracking test and the corrosion resistant test.

Example 2

1 part by weight of the polyacrylic acid 7333-X-60, 0.3 parts by weight of the diol compound containing two aliphatic rings, and 0.67 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 60 GU (Pass) and an adhesion of 4 B (Pass), and could pass the cracking test and the corrosion resistant test.

Example 3

1 part by weight of the polyacrylic acid 7333-X-60, 0.3 parts by weight of the diol compound containing two aliphatic rings, and 1.28 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 52 GU (Pass) and an adhesion of 4 B (Pass), and could pass the cracking test and the corrosion resistant test.

Comparative Example 7

1 part by weight of the polyacrylic acid 7333-X-60, 0.3 parts by weight of the diol compound containing two aliphatic rings, and 1.5 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 38 GU (Not Pass) and an adhesion of 3 B (Pass), could not pass the cracking test, and could pass the corrosion resistant test.

Example 4

1 part by weight of the polyester (V1B05, commercially available from Nanya Plastics Co.), 0.3 parts by weight of the diol compound containing two aliphatic rings, and 0.67 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 66 GU (Pass) and an adhesion of 5 B (Pass), and could pass the cracking test and the corrosion resistant test.

Example 5

1 part by weight of the epoxy resin (NPES-907, commercially available from Nanya Plastics Co.), 0.3 parts by weight of the diol compound containing two aliphatic rings, and 0.67 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 71 GU (Pass) and an adhesion of 5 B (Pass), and could pass the cracking test and the corrosion resistant test.

Example 6

1 part by weight of the polyurethane (URE-007, commercially available from Ching-Tai Resins Chemical Co., Ltd.), 0.3 parts by weight of the diol compound containing two aliphatic rings, and 0.67 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 64 GU (Pass) and an adhesion of 4 B (Pass), and could pass the cracking test and the corrosion resistant test.

Comparative Example 8

1 part by weight of the polyacrylic acid 7333-X-60, 0.3 parts by weight of the diol compound containing two aliphatic rings, and 0.67 parts by weight of strontium phosphate were mixed to form an organic coating. The organic coating was coated on a carbon steel (G3131 SPHC, commercially available from China Steel Corporation) to form an organic layer (having a thickness of about 55 micrometers). The two-layered structure of the carbon steel and the organic layer was the corrosion resistant structure. The test result is shown below: the organic layer could not pass the accelerated corrosion test.

Example 7

1 part by weight of the polyacrylic acid 7333-X-60, 0.3 parts by weight of the diol compound containing two aliphatic rings, and 0.67 parts by weight of strontium phosphate were mixed to form an organic coating. The organic coating was coated on the cold-rolled steel (GL AZ150, commercially available from Sheng Yu Steel Co., Ltd.) containing a dip aluminum zinc alloy layer (having a thickness of 41 micrometers) to form an organic layer (having a thickness of about 55 micrometers). The three-layered structure of the cold-rolled steel, the aluminum zinc alloy layer, and the organic layer was the corrosion resistant structure. The test result is shown below: the organic layer could pass the accelerated corrosion test.

Example 8

1 part by weight of the polyacrylic acid 7333-X-60, 0.3 parts by weight of the diol compound containing two aliphatic rings, and 0.67 parts by weight of strontium phosphate were mixed to form an organic coating. The organic coating was coated on the cold-rolled steel (Superdyma K27, commercially available from Nippon Steel Corporation) containing a dip magnesium aluminum zinc alloy layer (having a thickness of 27 micrometers) to form an organic layer (having a thickness of about 55 micrometers). The three-layered structure of the cold-rolled steel, the magnesium aluminum zinc alloy layer, and the organic layer was the corrosion resistant structure. The test result is shown below: the organic layer could pass the accelerated corrosion test.

Example 9

1 part by weight of the polyacrylic acid 7333-X-60, 0.3 parts by weight of the diol compound containing two aliphatic rings, and 0.67 parts by weight of strontium phosphate were mixed to form an organic coating. The organic coating was coated on the cold-rolled steel (ECOGAL Y35, commercially available from JEF Steel Corporation) containing a dip magnesium aluminum zinc nickel alloy layer (having a thickness of 29 micrometers) to form an organic layer (having a thickness of about 55 micrometers). The three-layered structure of the cold-rolled steel, the magnesium aluminum zinc nickel alloy layer, and the organic layer was the corrosion resistant structure. The test result is shown below: the organic layer could pass the accelerated corrosion test.

Example 10

1 part by weight of the polyacrylic acid 7333-X-60, 0.3 parts by weight of the diol compound containing two aliphatic rings, and 0.67 parts by weight of strontium phosphate were mixed to from an organic coating. An aluminum layer (having a thickness of 50 micrometers) was cold plated on the carbon steel G3131 SPHC, and the organic coating was coated on the cold plated aluminum layer to form an organic layer (having a thickness of 55 micrometers). The three-layered structure of the carbon steel, the cold plated aluminum layer, and the organic layer was the corrosion resistant structure. The test result is shown below: the organic layer could pass the accelerated corrosion test.

Comparative Example 9

1 part by weight of the epoxy resin NPES-907, 0.3 parts by weight of the diol compound containing two aliphatic rings, and 0.67 parts by weight of mica were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test result is shown below: the organic layer could not pass the accelerated corrosion test.

Example 11

1 part by weight of the epoxy resin NPES-907, 0.3 parts by weight of the diol compound containing two aliphatic rings, and 0.67 parts by weight of strontium aluminum phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test result is shown below: the organic layer could pass the accelerated corrosion test.

Example 12

1 part by weight of the epoxy resin NPES-907, 0.3 parts by weight of the diol compound containing two aliphatic rings, and 0.67 parts by weight of calcium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test result is shown below: the organic layer could pass the accelerated corrosion test.

Example 13

1 part by weight of the epoxy resin NPES-907, 0.3 parts by weight of the diol compound containing two aliphatic rings, and 0.67 parts by weight of calcium aluminum phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test result is shown below: the organic layer could pass the accelerated corrosion test.

Example 14

1 part by weight of the epoxy resin NPES-907, 0.3 parts by weight of the diol compound containing two aliphatic rings, and 0.67 parts by weight of calcium magnesium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test result is shown below: the organic layer could pass the accelerated corrosion test.

Comparative Example 10

1 part by weight of the epoxy resin NPES-907, 0.1 parts by weight of the diol compound containing two aliphatic rings, and 0.67 parts by weight of strontium phosphate were mixed to form an organic coating. The organic coating was coated on the cold-rolled steel Z27 containing the dip galvanizing layer (having a thickness of 20 micrometers) to form an organic layer (having a thickness of about 55 micrometers). The three-layered structure of the cold-rolled steel, the galvanizing layer (zinc layer), and the organic layer was the corrosion resistant structure. The test results are shown below: the organic layer had a gloss of 50 GU (Pass) and an adhesion of 3 B (Pass), could not pass the cracking test, and could pass the corrosion resistant test.

Comparative Example 11

1 part by weight of the epoxy resin NPES-907, 1.1 parts by weight of the diol compound containing two aliphatic rings, and 0.67 parts by weight of strontium phosphate were mixed to from an organic coating. The organic coating (having a thickness of about 55 micrometers) was coated on the cold-rolled steel Z27 containing the dip galvanizing layer (having a thickness of 20 micrometers) to form an organic layer. The three-layered structure of the cold-rolled steel, the galvanizing layer (zinc layer), and the organic layer was the corrosion resistant structure. The test results are shown below: the organic layer had a gloss of 69 GU (Pass) and an adhesion of 4 B (Pass), could not pass the cracking test, and could pass the corrosion resistant test.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A corrosion resistant structure, comprising:

a steel layer;

a metal layer containing zinc, aluminum, or a combination thereof disposed on the steel layer and in contact with the steel layer, and the metal layer and the steel layer have different compositions; and an organic layer disposed on the metal layer and in contact with the metal layer, wherein the organic layer includes an organic resin, a diol compound containing two aliphatic rings, and an alkaline earth metal salt or the alkaline earth metal aluminum phosphate.

2. The corrosion resistant structure as claimed in claim 1, wherein the diol compound containing two aliphatic rings has a chemical structure of

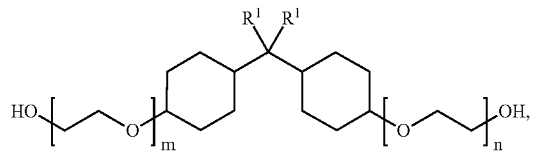

wherein each $R^1$ is independently H or $C_{1-3}$ alkyl group, and each of m and n is independently an integral of 1 to 10.

3. The corrosion resistant structure as claimed in claim 1, wherein the organic resin comprises polyacrylic acid, polyurethane resin, polyester resin, epoxy resin, or a combination thereof.

4. The corrosion resistant structure as claimed in claim 1, wherein the alkaline earth metal salt comprises strontium phosphate, magnesium phosphate, calcium phosphate, calcium magnesium phosphate, magnesium nitrate, calcium nitrate, or strontium nitrate.

5. The corrosion resistant structure as claimed in claim 1, wherein the organic resin and the diol compound containing two aliphatic rings have a weight ratio of 1:0.16 to 1:1.

6. The corrosion resistant structure as claimed in claim 1, wherein the organic resin and the alkaline earth metal salt or the alkaline earth metal aluminum phosphate have a weight ratio of 1:0.21 to 1:1.28.

7. The corrosion resistant structure as claimed in claim 1, wherein the organic layer has a thickness of 30 micrometers to 100 micrometers.

8. The corrosion resistant structure as claimed in claim 1, wherein the steel layer comprises cold-rolled steel, hot-rolled steel, or carbon steel.

9. The corrosion resistant structure as claimed in claim 1, wherein the metal layer comprises zinc metal, aluminum metal, aluminum zinc alloy, magnesium aluminum zinc alloy, or magnesium aluminum zinc nickel alloy.

10. The corrosion resistant structure as claimed in claim 1, wherein the metal layer has a thickness of 5 micrometers to 100 micrometers.

11. The corrosion resistant structure as claimed in claim 1, wherein the alkaline earth metal aluminum phosphate includes strontium aluminum phosphate or calcium aluminum phosphate.

* * * * *